Figure 4:
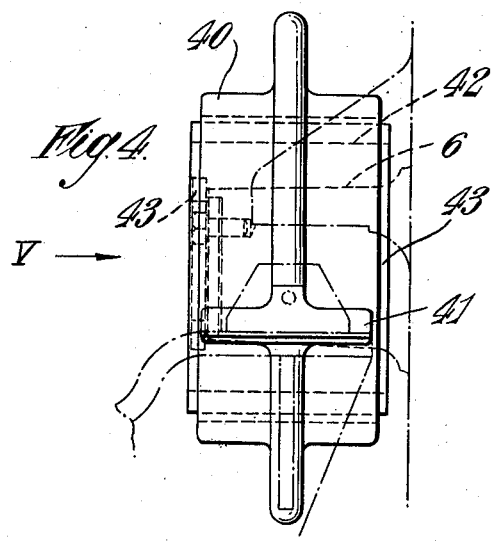

June 23, 1959 A. J. HIRST ET AL 2,891,744
RESILIENT SUPPORTS
Filed June 21, 1956 3 Sheets-Sheet 1
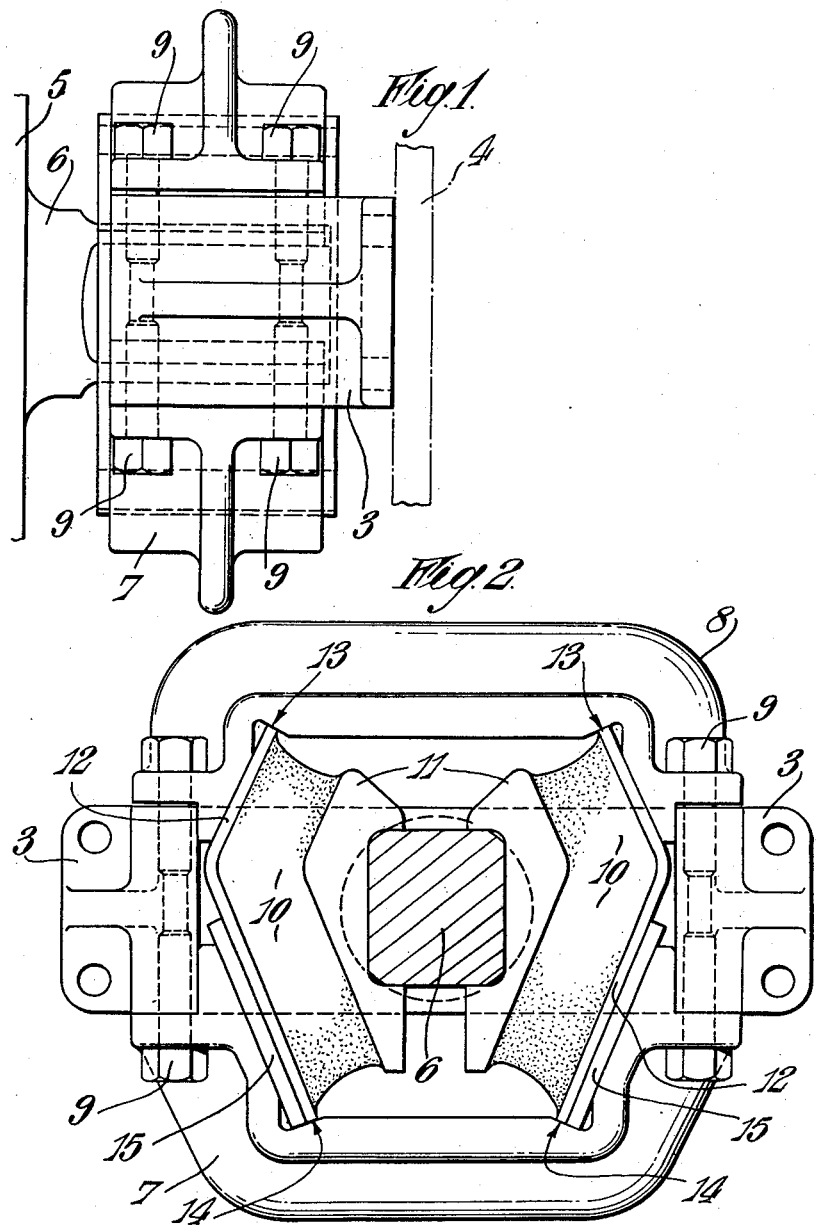
INVENTORS
ARCHIE JOHN HIRST
KENNETH JOHN BENJAMIN CLARK
BY
Harness, Dickey & Pierce
ATTORNEYS

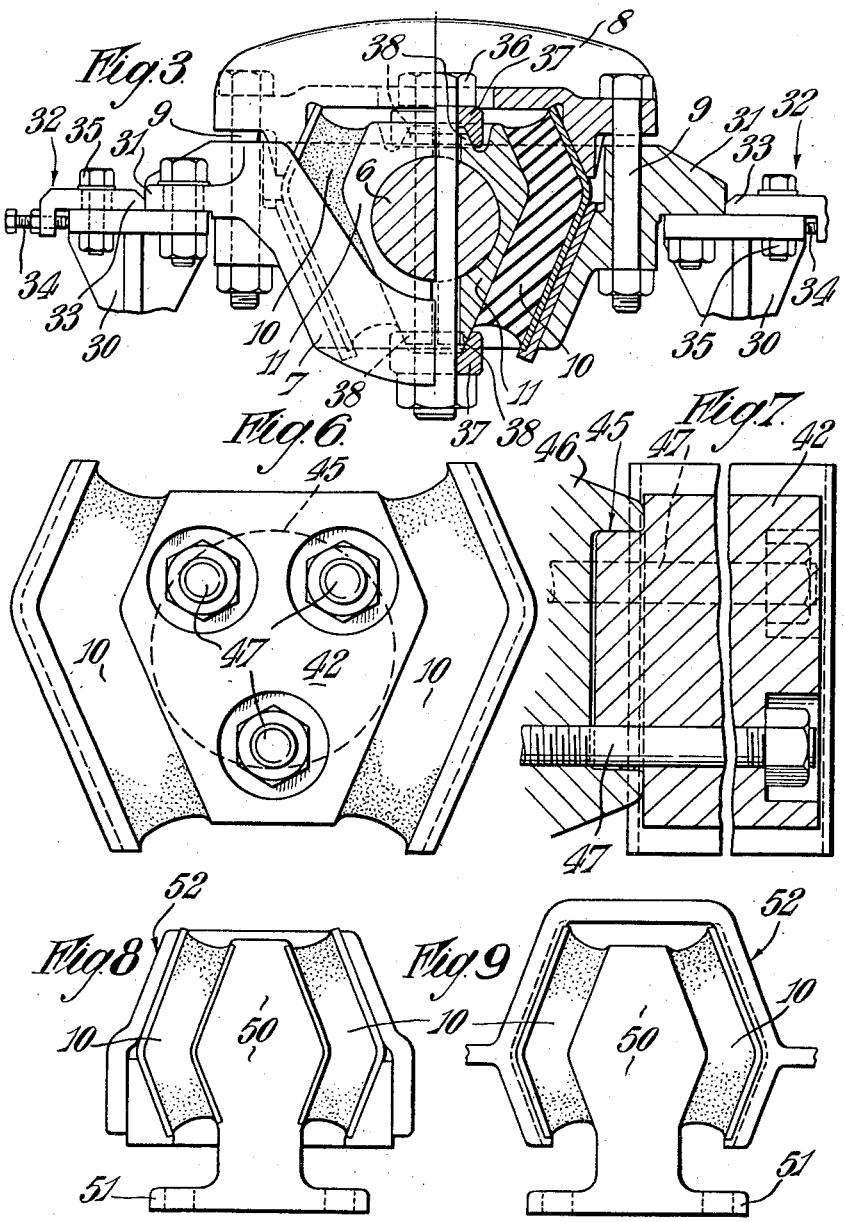

June 23, 1959  A. J. HIRST ET AL  2,891,744
RESILIENT SUPPORTS

Filed June 21, 1956  3 Sheets-Sheet 3

INVENTORS
ARCHIE JOHN HIRST
KENNETH JOHN BENJAMIN CLARK
BY
Harness, Dickey & Pierce
ATTORNEYS

United States Patent Office 2,891,744
Patented June 23, 1959

2,891,744

RESILIENT SUPPORTS

Archie John Hirst, Leicester, and Kenneth John Benjamin Clark, Thurcaston, England, assignors to Metalastik Limited, Leicester, England Application June 21, 1956, Serial No. 592,851

Claims priority, application Great Britain June 23, 1955

10 Claims. (Cl. 248—9)

This invention concerns resilient supports incorporating blocks or the like of rubber-like material and relates more particularly to supports for traction motors of electric locomotives.

With axle hung traction motors it is known to support the motor by a nose suspension and to provide support for said motor axially of its armature by side control gear so that the axle sleeves are relieved, at least in part, of such side support. The object of this invention is the provision of a novel form of support particularly suited for a nose suspension for use where side control gear is provided, the nose suspension being so constructed that the support forces thereof against movement of the motor axially of the armature (i.e. of the axle) may be readily matched with those of the side support gear. Another object of the invention is to provide a nose suspension of simple construction and of small bulk.

According to this invention the support comprises a pair of rubber or the like pads, blocks or the like arranged in V-formation between which the part to be supported (e.g. the nose of a nose suspension) lies, a further rubber or like pad or block to engage the side of said part opposite the blocks and a frame contractable to compress the blocks against said part.

According to a further feature of the invention the support comprises a frame in two parts, a pair of V blocks of rubber or like material arranged with their divergent openings facing towards one another to receive between them a member to be supported and means for drawing said parts together, the blocks engaging the frame parts in such manner that when the frame parts are drawn together the blocks are moved towards each other in a direction substantially normal to the direction of movement of the frame parts.

According to yet a further feature of the invention the support comprises a ring frame which embraces a pair of rubber or like blocks arranged in V-formation with their divergent openings facing towards one another and on opposite sides of a member to be supported, the blocks being radially compressed for introduction to the ring frame.

Figure 5:
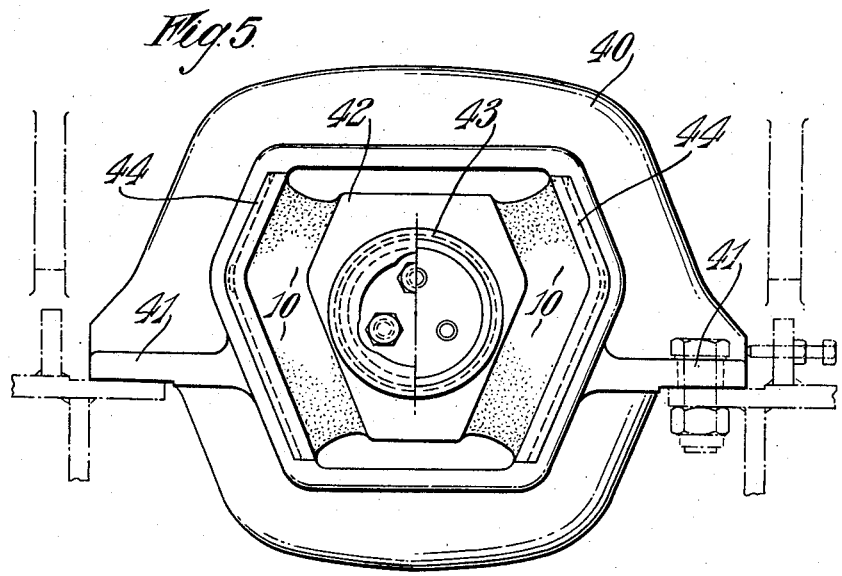

Practical applications of the present invention will now be described, by way of example only, with reference to the accompanying drawings whereof:

Fig. 1 is a side view of a support in accordance with the present invention provided to suspend the nose of an axle-hung traction motor, Fig. 2 is an end view, partly in section of the support of Fig. 1, Fig. 3 is a view corresponding to Fig. 2 and showing an alternative construction, Fig. 4 is a view corresponding to Fig. 1 and showing yet a third alternative construction, Fig. 5 is a view in the direction of the arrow V of Fig. 4, Figs. 6 and 7 are respectively an end and a sectional side view showing certain details of construction of yet another construction, and Figs. 8 and 9 is each a view corresponding to Fig. 2 and showing yet a further construction.

The resilient supports of Figs. 1 to 9 are applied to the nose suspension of an axle-hung traction motor for an electric locomotive it being understood that the motor in addition to a nose suspension is supported by means (not shown in the drawing) connecting the motor casing (on the opposite side to the nose suspension) to the bogie frame of the locomotive.

Referring to Figs. 1 and 2: the electric motor, which is diagrammatically represented by the reference numeral 5, is provided with a nose piece 6 which projects from that side of the motor away from the axle. In the particular arrangement being described the nose piece is of rectangular section but it may alternatively be of square section or cylindrical with flat surfaces formed thereon or of triangular section as is appropriate. The nose piece is supported from a cross-member 4 of the locomotive bogie, and to this end a ring frame comprising a lower casting 7 and an upper casting 8 is bolted to the cross-member of the bogie by lugs 3. The upper casting 8 may be drawn down on to the casting 7 by the bolts 9. Blocks 10 of rubber or the like material are provided between the nose piece 6 and the ring frame, these blocks constituting the springs referred to. Each block 10 is of V form and is bonded direct to nose blocks 11 which engage the sides of the nose piece 6 as shown. A plate 12 is bonded to the block 10 and it will be observed that the top edge of the upper limb of the plate 12 abuts a shoulder 13 on the casting 8. Similarly the lower edge of the plate 12 engages a shoulder 14, a packing piece 15 lying between plate 12 and casting 7.

When assembled the plates 12 are spaced by a predetermined amount from the shoulders 13 and 14 and when the bolts 9 are tightened the castings 7 and 8 of the ring frame are drawn together, thereby compressing the blocks 10. Such compression is limited by engagement of the plates 12 with the shoulders referred to. The spacer pieces 15 are removable and replaceable and in this way pieces of different thickness may be used thereby to alter the amount of compression of the blocks 10.

The arrangement of nose suspension for an electric traction motor just described has the following characteristics in use:

(i) Sideways movement of nose piece 6 in the horizontal direction as seen in Fig. 2 is resisted by compression of the blocks and therefore adequate support to the very considerable loads in this direction is afforded, the blocks being designed so that the flexibility to said movement is matched to that of said other support means, (ii) By adjustment of the ring frame 7, 8 the degree of pre-compression of the blocks may be varied (within limits) to exceed the maximum force producting horizontal sideways movements mentioned in the preceding paragraphs, (iii) By suitable selection of the relative lengths of the upper and lower arms of the V blocks and of the included angle thereof the lower arms may be arranged to support the downward thrust of nose piece 6 combined with the torque of the motor while the upper arms are designed to carry the smaller load produced when the nose piece tilts upwardly, (iv) Movements of the nose piece in the lengthwise direction of the nose (i.e. normal to the plane of the paper in Fig. 2) are resisted by the blocks in shear while angular movements of the nose piece about the long axis of the nose are resisted by the blocks mainly in shear but, due to the non-circular disposition of the blocks, the blocks are subjected to a relatively small degree of compression and tension upon said angular movements. Since in both cases the resistance is at least mainly due to the blocks in shear considerable flexibility to the movements is permitted, and (v) For the worst condition to be expected in operation producing upward tilt of the nose the resultant of all the forces acting at the suspension is such as to hold the spring blocks on to the nose.

With the construction described it will be appreciated that assembly and dismantling of the support for repair and maintenance of the motor may readily be performed. It is preferably arranged that there be clearance between the end faces of the plates 12 and the casting 7 so that when the bolts 9 are removed and the casting 8 taken away the motor, together with the nose piece 6 and the blocks 10, may be raised by pivoting about the axis of the axle upon which the motor is hung. The nose blocks 11 may be held on to the nose piece 6 during assembly and dismantling, for example, by spring clips, straps, bands, or in any other convenient way such holding means not performing any part in function of the support but being merely a convenience assisting in assembly and disassembly.

In the arrangement of Fig. 1 the included angle was 130° which was divided equally on each side of a transverse horizontal plane.

Referring now to Fig. 3: the frame comprising castings 7, 8 (which are drawn together by bolts 9 to compress the rubber or like blocks 10 as described above) is supported from the transom of the bogie frame by horizontal brackets 30 upon which ears 31 of casting 8 rest. The ears 31 engage stops 32 for accurate transverse location of the assembly and each stop 32 comprises a finger 33 adjustable by a setting screw 34, the finger being bolted, at 35, to the bracket 30 when finally positioned.

The nose piece 6 is cylindrical and the nose blocks 11 are secured thereto in the following manner: a diametral vertical hole in the nose piece 6 receives a clamping bolt 36 upon which is mounted a pair of washers 37 having conical surfaces to engage correspondingly formed parts of the nose blocks (these parts are indicated generally at 38).

When the bolt 36 is drawn up the washers 37 engage parts 38 to clamp the nose blocks 11 to the nose piece 6.

The assembly and dismantling of the support for repair and maintenance of the motor or other part is as described for the arrangement of Figs. 1 and 2.

In the arrangement of Figs. 4 and 5 a one piece frame 40 is provided having flanges 41 by which it is secured to horizontal brackets in similar manner to that described in Fig. 3.

The nose piece 6 is cylindrical (though preferably with a small taper) to receive a one piece nose block 42, the block being retained in position by a ring 43. The rubber or like blocks 10 are bonded or otherwise integrally united with the nose block 42 and each block 10 has bonded to it a plate 44.

The blocks 10 are radially compressed and while in this state the assembly of nose block 42, rubber blocks 10 and plates 44 is introduced to frame 40 and upon release the plates 44 spring out to grip frame 40. The nose block 42 is held to the nose piece 6 by ring 43.

An alternative way of attachment of the nose block 42 to the motor is shown in Figs. 6 and 7. The block 42 is spigotted, at 45, into the motor casing 46 and is secured thereto by bolts 47. As in the arrangement of Figs. 4 and 5 the blocks 10 are united to nose block 42 and compressed to allow the assembly into a one-piece frame, such as the frame 40 of Figs. 4 and 5.

Figs. 8 and 9 illustrate yet further alternatives. In both figures (which show different construction as will later be described) the nose block 50 is carried by a foot 51 which is secured to the bogie frame and the motor casing has secured to it the frame 52.

Fig. 8 diagrammatically illustrates the frame 52 in two parts and adjustable, as by bolts in the manner described above, to compress the rubber blocks 10. The latter are separate of the nose block 50 as in the manner of arrangement of Figs. 1 and 2.

The arrangement of Fig. 9 has the blocks 10 bonded to the nose block 50 and there is a one-piece frame 52 into which the nose block assembly is fitted by radial compression of the blocks 10 in the manner described above.

It may be arranged that with a two-piece adjustable frame (e.g. frame 7, 8 of Figs. 1 and 2 or Fig. 3 or Fig. 8) a unit comprising nose block and rubber blocks bonded together (for example, as in the arrangement of Fig. 5) may be provided. Again an assembly of separate nose block(s) and rubber blocks (e.g. as in Figs. 1 and 2) may be radially compressed and introduced to a one-piece frame, such as frame 40 of Fig. 5.

We claim:

1. A nose suspension for a traction motor of an electric locomotive comprising a horizontal nose piece carried by the motor, a frame to surround the nose piece, a pair of rubber V blocks held in a state of radial pre-compression between the frame and the nose piece, said blocks being spaced apart and on opposite sides of a vertical plane through the nose piece, which lies between the pair of limbs of each block, a flat surface on the nose piece in engagement with the inner surface of each limb of the V blocks and a flat surface on the frame in engagement with the outer surface of each limb of the V blocks, the V blocks being arranged with one limb of each block lying above a substantially horizontal plane and the other limb of each block lying below said plane.

2. A nose suspension for a traction motor as claimed in claim 1 wherein the two limbs to one side of said horizontal plane are of greater length, as measured from the junction of the limbs of a block to the extremities thereof, than the limbs to the other side of the horizontal plane.

3. A nose suspension for a traction motor as claimed in claim 2 wherein the limbs below said horizontal plane are of greater length than the limbs above said plane.

4. A nose suspension for a traction motor as claimed in claim 3 wherein the angles between the limbs of each block and said horizontal plane are the same.

5. A nose suspension for a traction motor of an electric locomotive comprising a horizontal nose piece carried by the motor, a frame in two parts to surround the nose piece, a pair of rubber V blocks held in a state of radial pre-compression between the frame and the nose piece, said blocks being spaced apart and on opposite sides of the vertical plane through the nose piece, which lies between the pair of limbs of each block, a flat surface on the nose piece in engagement with the inner surface of each limb of the V blocks, a flat surface on the frame in engagement with the outer surface of each limb of the V blocks, the V blocks being arranged with one limb of each block lying above a substantially horizontal plane and the other limb of each block lying below said plane, and means for drawing said frame parts together to compress the V blocks against the nose piece.

6. A nose suspension for a traction motor as claimed in claim 5 wherein means are provided for limiting the extent to which the two part frame may be drawn together, said limiting means comprising a plate which constitutes a backing for each of the pair of V blocks and stops carried by the two parts of the frame, said stops being engaged by the plate when said frame is drawn up to a predetermined extent.

7. A nose suspension for a traction motor as claimed in claim 6 in which the backing plate of one of the pair of V blocks abuts a spacer removably and replaceably carried by the frame part.

8. A nose suspension for a traction motor of an electric locomotive comprising a horizontal nose piece carried by the motor, a two part frame to surround the nose piece, a pair of rubber V blocks held in a state of radial pre-compression between the frame and the nose piece, said blocks being spaced apart and on opposite sides of a vertical plane through the nose piece, an intermediate block fitted to the nose piece and having flat surfaces to engage with the inner surfaces of the limbs of the V blocks, a flat surface on the frame in engagement with the outer surface of each limb of the V blocks, the V blocks being arranged with one limb of each block lying above a substantially horizontal plane and the other limb of each block lying below said plane, and means for drawing said frame parts together radially to compress the V blocks against the intermediate blocks.

9. A nose suspension for a traction motor as claimed in claim 8 wherein the rubber blocks are bonded to said intermediate blocks.

10. A nose suspension for a traction motor as claimed in claim 9 wherein said intermediate block is in two parts, one for each V block, and there is provided a single attachment device by which the two parts of the intermediate block are drawn up against the nose piece.

References Cited in the file of this patent

UNITED STATES PATENTS

| 1,729,381 | Golden | Sept. 24, 1929 |

FOREIGN PATENTS

| 478,909 | Great Britain | Jan. 27, 1938 |
| 564,215 | Great Britain | Sept. 18, 1944 |
| 614,836 | Great Britain | Dec. 23, 1948 |